Feb. 3, 1953          R. T. SHEEN          2,627,453

AUTOMATIC TITRATION SYSTEM

Original Filed March 17, 1948          7 Sheets-Sheet 1

INVENTOR
Robert T. Sheen
BY
ATTORNEYS

Fig. 11.

Patented Feb. 3, 1953

2,627,453

UNITED STATES PATENT OFFICE 2,627,453

AUTOMATIC TITRATION SYSTEM

Robert T. Sheen, Wyndmoor, Pa., assignor to Milton Roy Company, Chestnut Hill, Pa., a corporation of Pennsylvania Original application March 17, 1948, Serial No. 15,431. Divided and this application June 24, 1949, Serial No. 101,106

2 Claims. (Cl. 23—253)

The present invention relates to chemical titration systems of the character which may be employed to maintain a particular chemical concentration in a solution.

The present application is a division of my application Serial No. 15,431, filed March 17, 1948, for Automatic Titration System.

My applications Serial No. 101,105 filed June 24, 1949 for Titration System and Serial No. 173,650 filed July 13, 1950 for Titration System relate to processes and apparatus for titration under constant end points.

The solution whose concentration is being controlled is herein called the main solution. The additive to the main solution is a concentrated form of the ingredient whose concentration is being controlled.

A purpose of the invention is to facilitate the control of chemical concentration in strong solutions in which the direct measurement of concentration is difficult.

A further purpose is to withdraw a fractional metered sample from the main solution, to titrate such sample by a sample reagent introduced in accurate proportion to the sample, to an end point at which the concentration can be measured accurately, and to control the introduction of a main reagent into the main solution in accordance with the concentration measured at the end point.

A further purpose is to pump off continuously a stream of fractional sample from the main solution, to concurrently pump a stream of sample reagent, preferably by duplex pumps having a common drive, to titrate the sample by the sample reagent, to continuously sense the concentration of the titration mixture at the end point, to pump the main reagent into the main solution and to control the feed of the main reagent in accordance with the concentration of the titration mixture which is sensed.

A further purpose is to employ a duplex pump for the fractional sample and for the sample reagent, both pump units of which are operating in phase.

A further purpose is to control a strong acid or strong alkali concentration in the main solution by pumping off continuously a fractional metered sample, pumping into the fractional sample a proportional metered quantity of alkali or acid sample reagent, as the case may be, to attain an end point, to sense the hydrogen ion concentration at the end point, and to control addition of acid or alkali to the main solution thereby.

A further purpose is to pump off a fractional sample from the main solution and meter the same, to dilute the sample by a proportional metered quantity of diluent, to sense the concentration of the diluted sample and to control the addition of main reagent in accordance with the concentration sensed.

A further purpose is to regulate the oxidation potential of a main solution by continuously pumping off a metered sample, continuously pumping into the sample a proportional metered quantity of oxidation potential sample reagent of a character opposed to that of the main solution, continuously sensing the oxidation potential of the mixture of sample and sample reagent, introducing oxidation potential main reagent to the main solution, and regulating the quantity of oxidation potential main reagent in accordance with the oxidation potential of the mixture of the sample and sample reagent as sensed.

A further purpose is to blanch vegetables, such as peas, by feeding the vegetables through a main solution containing a strong alkali concentration, continuously pumping off a metered quantity of the main solution as a fractional sample, continuously metering and titrating an acid reagent, preferably a buffer acid reagent, with the sample, continuously sensing the hydrogen ion concentration of the titration mixture, adding alkali main reagent to the main solution and controlling the addition of alkali main reagent in accordance with the hydrogen ion concentration of the titration mixture.

A further purpose is to control the concentration of a strong acid solution, of a strong alkali solution, for example for textile treating, or of a textile bleach solution suitably of chlorine or hydrogen peroxide.

Further purposes appear in the specification and in the claims.

In the drawings I have chosen to illustrate a few only of the numerous embodiments in which my invention may appear, choosing the forms shown from the standpoints of convenience in illustration, satisfactory operation and clear demonstration of the principles involved.

In the prior art considerable difficulty has been encountered in controlling the chemical concentrations of strong solutions due to the fact that control sensing elements are difficult to apply in such solutions, and are likely to be inaccurate. It has been proposed (Smith 1,684,645) that the hydrogen ion concentration of a main solution be changed by drawing off a sample through a constant orifice variable head device into a constant head device, supplying a reactant through a constant orifice constant head device which will bring the concentration into a range which can be readily measured, and controlling the addition of a main reactant into the main solution in accordance with the titration of the sample and the sample reactant. This device operates with considerable inaccuracy and considerable time lag.

In accordance with the present invention it is possible to control a strong concentration in the main solution continuously with a high degree of precision by continuously pumping off a sample from the main solution, continuously combining with this sample a sample reactant which is pumped in proportional quantity to the sample, and controlling the additions of main reactant to the main solution by sensing the concentration of the titration mixture, that is, electrically determining the end point of titration as an electrical characteristic. The fractional sample and the sample reactant are most desirably withdrawn by a duplex pump having a common drive, so that, once the proportion between the sample and the sample reactant is determined, the feeds are for the time being constant, and the variation is in the concentration of the titration mixture in accordance with the change in the concentration of the sample. The two pumps preferably will operate in phase, so that variations in titration will not occur on account of variations in pumping. The volume of the titration chamber is selected so that it will preferably exceed one minute's pumping capacity of the duplex pump, so that the equipment will not hunt, and the increments of change will be small.

The process according to the invention has the advantage over those processes which titrate the main solution that the main solution is not loaded up with salts or other products of titration, and the choice of the titration reactant is not limited by the character of the process in which the main solution is used. Thus the sample reactant which performs the titration may be a buffer when a buffer would be undesirable in the main solution, and may be a toxic substance when the main solution must be free from toxicity.

The present device is much more positive than the variable head variable orifice or fixed head variable orifice devices of the prior art.

The principles of the invention are applicable to concentrations of various characters, such as acidimetry (and of course alkalimetry), control based on ion content such as conductivity, control based on oxidation potential, or the like. The character of the sample reactant and the main reactant will depend on what concentration is being controlled, for example in the case of acidimetry the sample reactant may be an acidimetry reactant of the proper concentration, or a diluent, while in the case of oxidation potential characteristics the sample reactant will be a reducing agent if the main solution is oxidizing, and an oxidizing agent if the main solution is reducing.

Likewise a color reactant may be employed, sensed by a photometer or colorimeter.

Figure 1:
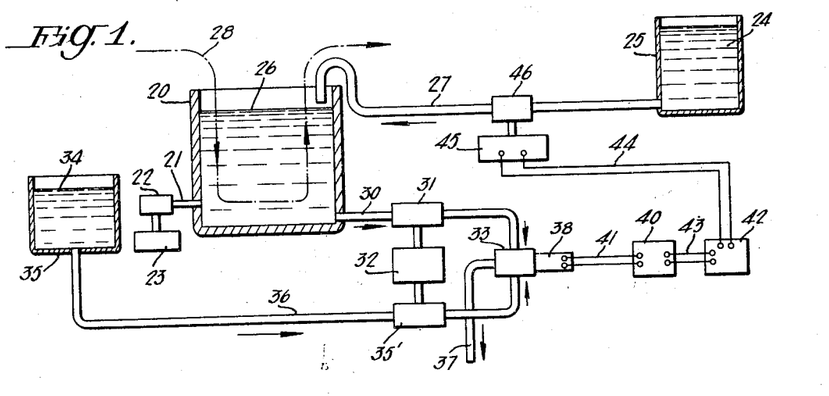
Figure 1 is a diagrammatic illustration of a system of titration embodying the invention.

Referring to Figure 1, a container 20 is shown for the main solution, which may have any suitable shape, whether that of a treating vessel as indicated, or that of a conduit or pipe. If desired to add makeup water independently so as to hold volume, or level, this can be accomplished through a pipe 21 through float control 22 (suitably including a float in the tank, not shown) from a source 23.

A main reagent 24 in a container 25 is introduced to the main solution 26 through a pipe 27 under metering control later to be described. The main solution will commonly be used for process treatment, as indicated by a dotted line 28 suggesting flow of material through the main solution, with accompanying change in composition of the main solution due to "drag out" of main solution with the material processed, and due to chemical reaction between the reactant and the material being processed. It will be understood, however, that the main solution may be used for any other suitable purpose.

In order to accomplish the control of the additions of main reactant 24, a fractional sample of the main solution 26 is continuously withdrawn through a pipe 30 by a metering device, preferably a metering pump 31, driven by a drive 32 and feeding to a titrating chamber 33. Thus a continuous sample is obtained, which in quantity will suitably be a minute proportion of the total main solution, but in any case will be representative of or will bear an established relation to the main solution. While the metered feed from the pump 31 will preferably be made adjustable as later explained, for any given indefinite period of operation, the sample will be withdrawn at a rate which is suitably invariable.

In order to titrate the sample, a sample reagent 34 in solution or other liquid form from a container 35 is supplied by a pipe 36 through a metering device, suitably a metering pump 35', having discharge which is proportional to that of the metering device 31, preferably by virtue of the fact that the two pump units are driven by the same drive 32, thus constituting a single duplex pump. The cylinder volumes and/or strokes of the pistons are adjustable to provide the desired proportional feed of the sample reagent to the fractional sample, and for a suitably indefinite period proportionally will remain the same and the end point concentration in the titrating chamber 33 will accordingly vary with the concentration of the sample. The titrating reaction mixture will suitably be discharged from the titrating chamber 33 as by an overflow pipe 37, the discharge being wasted or recovered as desired but normally not returned to the main solution. The level of overflow or the overflow resistance at 37 will be set to assure an adequate pressure differential across pumps 31 and 35' to assure metering action by these pumps.

A feature which differs from usual titration is that the end point concentration in the titrating chamber is constantly varying. In ordinary titration with an indicator, the end point concentration is invariable and the quantity of reagent added varies with the sample concentration, but with the present system the sample reactant addition does not change for an indefinite period.

A sensing element 38 of suitable character is in contact with the reaction mixture in the titrating container, and will be of any well known type which responds to the particular characteristic which is being controlled. For example if hydrogen ion concentration is being controlled, a hydrogen ion sensing element of any well known type, such as a glass electrode, may be used. If total ion concentration is being controlled, a conductivity sensing element of well known character will be employed. If oxidation potential is being indicated, a sensing element for oxidation potential of well known character may be used. The sensing element may also sense by color, viscosity or specific gravity as well known. Correspondingly if the concentration of any particular ion is being controlled, a sensing element responding to the concentration of that ion will be employed.

The sensing element is connected to an automatic indicator or preferably a recorder 40 of well known character, as it is usually desirable to keep a chart, conventional wiring 41 being used, and an automatic controller 42 also of conventional character is connected to the recorder by wiring 43. The indicators and recorders for any such purpose are available on the market from various sources, and their detail forms no part of this invention. The controller through wiring 44 controls the drive 45 of a metering pump 46 in the main reagent pipe 27, so that the quantity of main reagent supplied to the main solution is controlled by the concentration indicated by the sensing element.

Figure 2:
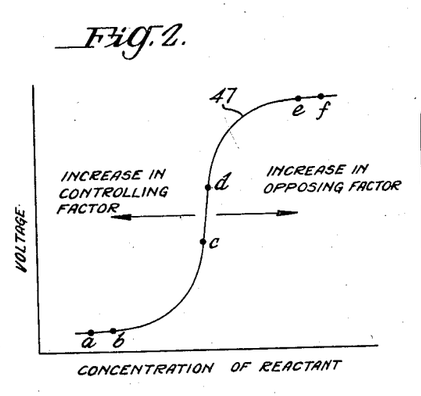
Figures 2 and 3 are curves useful in explaining the invention.
Figure 3:
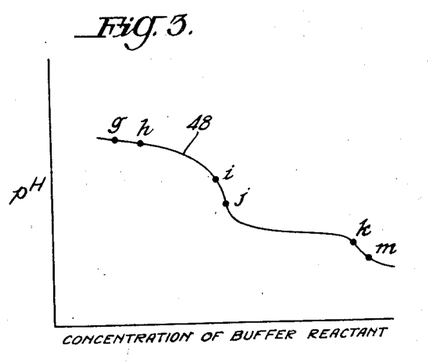

As best seen in Figure 2, a typical titration curve 47 is shown, using as ordinates the voltage across the sensing element and as abscissae the concentration of the particular reactant present in the main solution. It will be noted that over a particular concentration range $ab$ corresponding to one extreme concentration of the reactant and over another concentration range $ef$ corresponding to an opposite extreme concentration of the reactant, very little difference in voltage results from considerable change in concentration. For example, if hydrogen ion concentration is being controlled, the portion $ab$ of the curve might correspond to the condition for a strong acid solution and the portion $ef$ would therefore correspond to the condition for a strongly basic solution. Neither of these concentrations can be accurately controlled by directly sensing the voltage across the sensing element. By the addition of the sample reactant, however, which is of opposite chemical character from the main reactant, the concentration in the sample will move into the range of the portion of the curve $cd$ which corresponds to a much weaker solution than that corresponding to the extremes. At the portion $cd$ of the curve a very considerable voltage change occurs for a small change in concentration and therefore highly accurate control can be accomplished.

Where hydrogen ion concentration is being controlled, the sample reactant will preferably be a buffer acid or alkali in sufficient concentration to bring the hydrogen ion concentration in the titrating chamber into a range for accurate control. Thus if the main solution corresponded to the range $gh$ on curve 48 of Figure 3 (which plots pH as ordinates against concentration of buffer acid as abscissae), the sample reactant would bring the concentration into the range $ij$ or $km$ at which accurate control could be accomplished.

Unbuffered acids such as sulphuric, nitric, hydrobromic, or hydrochloric will preferably not be used, where the main solution is also unbuffered, as a variation in addition of sample reactant would cause a very wide variation in the pH. A much more gradual slope of the curve is desired, so that for any given addition of sample reactant within a reasonable tolerance there will be only one characteristic pH, thus accomplishing a very small change in pH for a given small increment of buffer sample reactant. Suitable buffer acids which may be used as sample reactants are phosphoric, acetic, oxalic, citric, tartaric, carbonic and boric acids. Suitable buffer alkalis are trisodium phosphate, sodium carbonate, sodium borate, and sodium meta silicate. In general the buffer acids and alkalis are less than 50% ionized, and in the great majority of cases are not more than 10% ionized. In the event that the main solution is sufficiently buffered, a strong acid or alkali may be used as the sample reagent.

For example, using buffer acids and alkalis rather than the completely ionized type, it is possible to control the hydrogen ion concentration within plus or minus 0.004 normal rather than 0.02 normal, which would be difficult to obtain with the non-buffered sample reactant.

Figure 4:
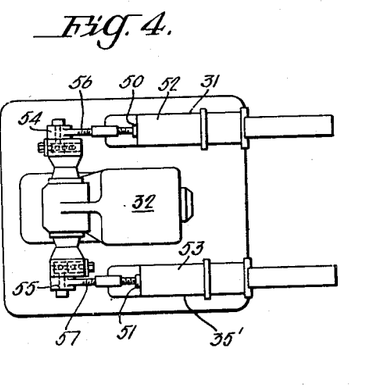
Figure 4 is a diagrammatic top plan view of a duplex pump which may be employed in the invention.

A very simple construction of the duplex pump is shown in Figure 4, in which the individual pumps have their pistons 50 and 51 operating in cylinders 52 and 53 and connected to cranks 54 and 55 on the drive 32 by connecting rods 56 and 57.

The piston strokes are adjustable in any suitable way, as for example by adjusting the crank arms by any suitable means, such as is shown.

It will be seen from this view that instead of being 180° out of phase as in prior art duplex pumps, the pumps 31 and 35' operate in phase, each having its suction stroke at the same time as the other and its pressure stroke at the same time as the other. Thus any surging which occurs in the titrating chamber due to the pumping action is self compensating and the tendency which otherwise would exist for the sensing element to hunt due to change in the concentration of the titration mixture on each pump cycle is eliminated. The pumps will preferably deliver 10 to 100 strokes per minute and the chamber will preferably retain the effluents of 1 to 2 minute's pumping. As later explained, a more elaborate form of duplex pump adjustment will preferably be employed, but it will be understood that the form of Figure 4 is adequate for many types of service and is useful to explain the invention. The settings of the crank arms 54 and 55 will be adjusted to give the correct proportionality between the fractional sample and the sample reactant.

Figure 12:
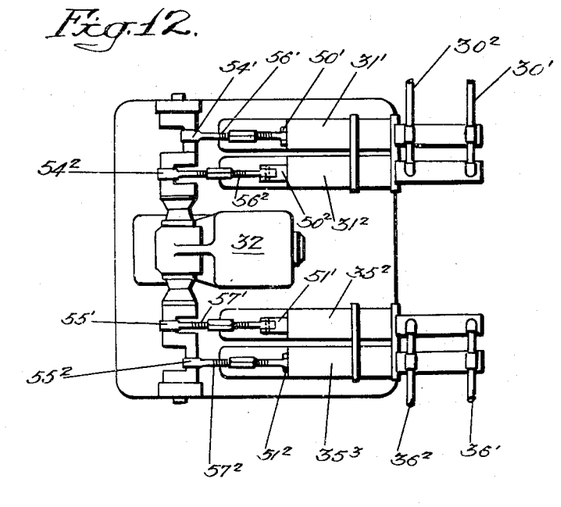
Figure 12 is a diagrammatic top plan view of a variation in the duplex pump.

As seen in Figure 12, where extreme accuracy in pumping of the sample and sample reagent into the titration chamber are required, each duplex pump may if preferred consist of a pair of constant feed pumps, $31'$ and $31^2$ and $35^2$ and $35^3$, preferably of the step valve type, and each having a common inlet $30'$ or $36'$ and a common outlet $30^2$ or $36^2$. The pump pistons $50'$ and $50^2$ and $51'$ and $51^2$ in each pair are substantially $180°$ out of phase with respect to one another, so that each pair of pumps $31'$ and $31^2$ and $35^2$ and $35^3$ develops a constant delivery. The respective cranks $54'$ and $54^2$ are substantially $180°$ out of phase with one another, and the same condition prevails with the cranks $55'$ and $55^2$. The connecting rods $56'$ and $56^2$ and $57'$ and $57^2$ are respectively adjustable. The actual structure shown in Figure 12 is merely suggestive of the more precise constant feed pumps which may be used on both sides of the duplex drive. See Sheen, Sheen and Sallfrank application Serial No. 778,316, filed October 7, 1947, for Constant Delivery Pump. With the form suggested in Figure 12, a very high degree of uniformity of pumping can be obtained both for the sample and sample reagent entering the titration chamber.

The following are typical illustrations of the service to which the invention may be applied.

*Example I*

In the blanching of vegetables such as peas preparatory to canning, the peas are subjected to a cold 0.2 normal solution of alkali such as sodium or potassium hydroxide. The concentration must be held within plus or minus 0.02 normal. The peas are held in a conventional reel type pea blancher which corresponds to container 20.

Alkalinity is constantly lost by "drag out" and by neutralization or carbonation due to the peas. This concentration corresponds to a pH above 11, which is very difficult to control by ordinary methods within any such tolerance. As applied to the system of Figure 1, sodium hydroxide solution forms the main reactant, and a buffered acid solution, suitably phosphoric acid, forms the sample reactant, the titrating mixture being maintained at a range such as $ij$ or $km$ on curve 48 of Figure 3. It is thus possible to maintain a tolerance within plus or minus 0.004 normal, which is far better than that required for this service. Regulation may be at the range between trisodium phosphate and disodium phosphate at pH 8 to 9, or at the range between disodium phosphate and monosodium phosphate at pH 4 to 5 in the titrating chamber. While these are broad pH ranges, control may be maintained within plus or minus 0.2 pH.

*Example II*

In this case the alkalinity concentration in container 20 is controlled for the purpose of textile bleaching, at a concentration between 3.0 and 3.3% caustic soda in water. The main reactant 24 is caustic soda solution while the sample reactant 34 is a buffer acid such as phosphoric acid solution.

*Example III*

A sulphuric acid bath 20 is to be held at 1% concentration plus or minus 0.25%. In this case the main reactant is sulphuric acid, and the sample reactant is a buffer alkali, such as sodium borate.

*Example IV*

The conductivity of an electroplating bath 20 is to be maintained by addition of a salt, sodium sulphate. In this case the main reactant is sodium sulphate solution and the sample reactant is a diluent, distilled water.

*Example V*

A strong bleaching solution containing chlorine or alkali metal hypochlorite is to be held at a specified concentration. In this case the main reactant will be a water solution of chlorine, a flow of chlorine into water solution or a water solution of sodium hypochlorite, and the sample reactant will be sodium thiosulphate.

*Example VI*

A strong bleaching solution 20 of hydrogen peroxide is to be held at a specified concentration. In this case the main reactant is hydrogen peroxide solution and the sample reactant is potassium permanganate solution, or sodium nitrite, using an oxidation potential sensing element.

This procedure may be followed with any other peroxygen compound, such as barium peroxide, zinc peroxide, sodium peroxide, sodium perborate, magnesium peroxide, calcium peroxide, or the like: with acidification if necessary.

*Example VII*

A strong peroxygen compound concentration such as calcium peroxide is controlled by drawing off a fractional sample and introducing it into the titration chamber, feeding into the titration chamber a proportional amount of potassium permanganate solution as a sample reactant, and also feeding in a dilute solution of sulphuric acid in proportional quantity. A triplex pump may be used with the extra cylinder applied to the sulphuric acid, or it may be separately fed.

*Example VIII*

A reducing wash 20 for textile dyeing is to be maintained at a specified concentration of sodium thiosulphate. In this case the main reactant is sodium thiosulphate and the sample reactant is potassium dichromate solution.

It will be understood of course that the sensing element will be of a character corresponding to the concentration which is being controlled, suitably a hydrogen ion electrode where pH is being controlled, a conductivity cell where conductivity is being controlled and an oxidation potential or other oxidation sensing element where oxidation potential is being controlled.

The metering pumps employed at 31, $35'$ and 46 will preferably be of the step valve type as shown in Milton Roy Sheen U. S. Patents 2,263,429 and 2,367,893.

The preferred form of delivery adjustment for the pump is that shown in Milton Roy Sheen U. S. patent application Serial No. 654,180, filed March 13, 1946, for Stroke Control Mechanism, now to be described. This mechanism is illustrated in Figures 5 to 10 hereof. Any other suitable type of control of delivery as by automatic variable speed control can of course be used.

For pump $35'$ a similar microadjustment to that of Figures 5 to 10 may be used with hand adjustment to permit adjustment during operation.

Figures 5, 6, 7:
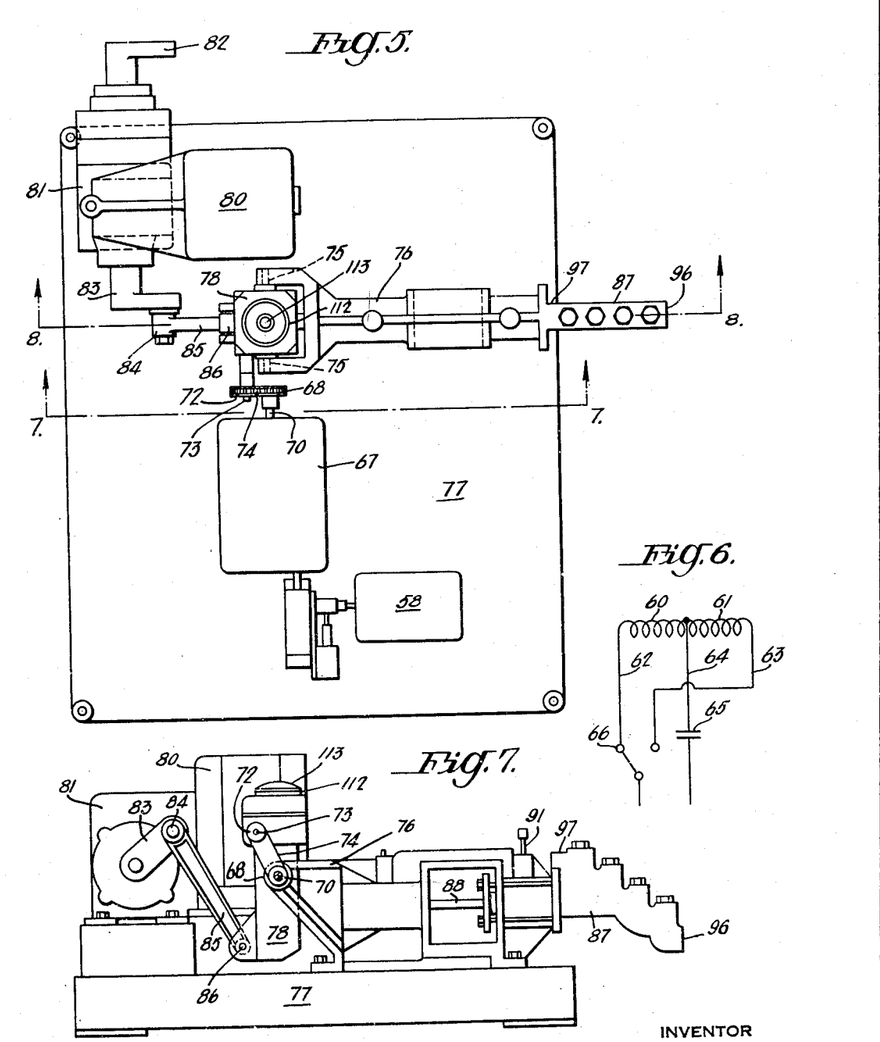
Figure 5 is a top plan view of a micro-adjustment for one of the pumps or pump units.
Figure 6 is a circuit diagram showing a motor and its connections.
Figure 7 is a section of Figure 5 on the line 7—7.

The controller 42 of well known type causes the electric drive motor 58 for the stroke adjustment to be turned on and off and reversed. A suitable type of motor winding is shown having opposed coils 60 and 61 connected by end leads 62 and 63 to the source through the control mechanism, with a center lead 64 having a series capacitor 65 and with a discriminating switch 66 on the control mechanism which determines when the motor will start or stop and which section of the winding is to be actuated and therefore in which direction the motor is to run on starting. It will be understood that this feature is intended to be diagrammatically disclosed merely. The drive from the stroke control adjustment motor is through any suitable speed reduction 67 to a sprocket 68 which is on an adjustment shaft 72 having the same axis as the adjustment head later to be described. The sprocket 73 connects with a sprocket 75 on a worm shaft 76 by a chain 77. The adjustment shaft 70 is in line with a fixed pivot 75, on the frame 76 supported on base 77 and about which adjustment head 78 swings. The adjustment head is driven in its swinging path by an electric motor 80 having a speed reducing unit 81 and a crank 82 which may be connected to the opposite duplex pump unit (which with its adjustment head and related mechanism, if used, is not shown, as it is merely an opposite counterpart of that described). The electric motor 80 also drives a crank 83 (in phase with crank 82) which makes pivotal connection at 84 to a driving link 85 which is pivotally connected to the adjustment head 78 at 86.

Under the action of this drive, the adjustment head swings back and forth desirably in an invariable path at a frequency which is determined by the speed adjustment on the motor. The linear relation of the adjustment and the change of stroke, and the condition of equality, later described, can very conveniently be obtained by regulating the arc through which the adjustment head swings to 60° with as much precision as is necessary, and the arc of swing should then be equal on either side of a line through the fixed pivot 75 of the adjustment head perpendicular to the axis of the pump cylinder as later described.

The pump itself may be of any suitable type having a metering action suitably due to a reciprocating piston, and the following is intended to indicate a very desirable form.

Figure 8:
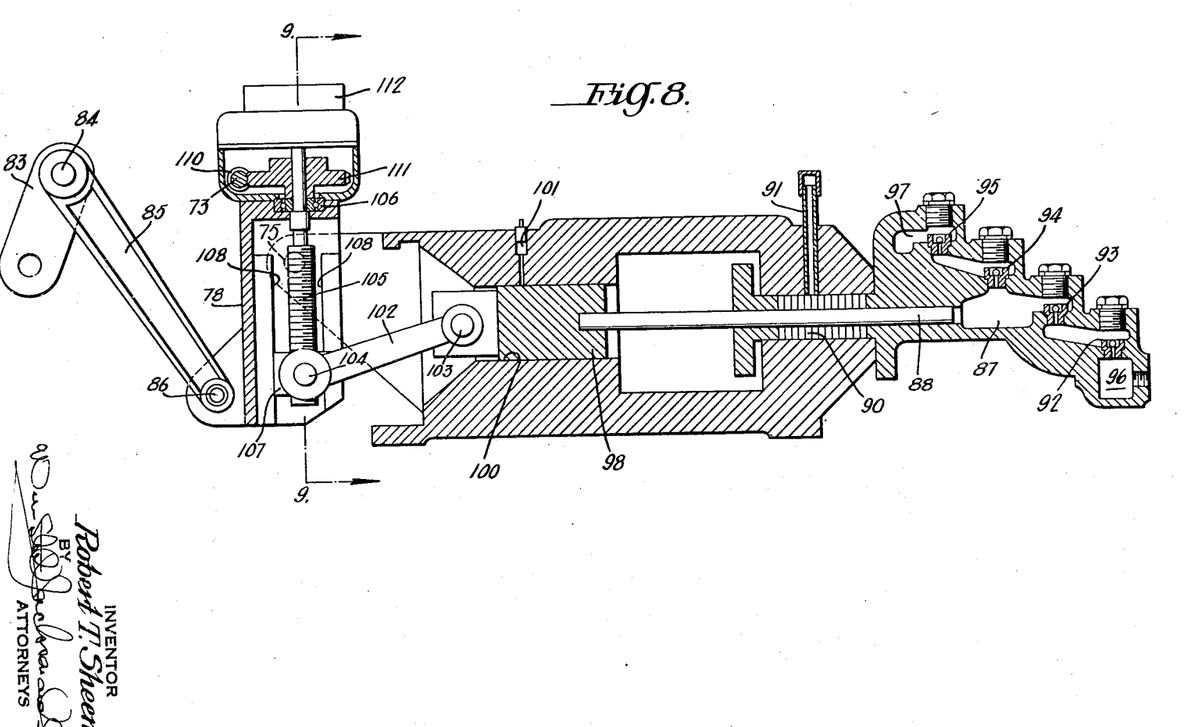
Figure 8 is a section of Figure 5 on the line 8—8.
Figures 9, 10:
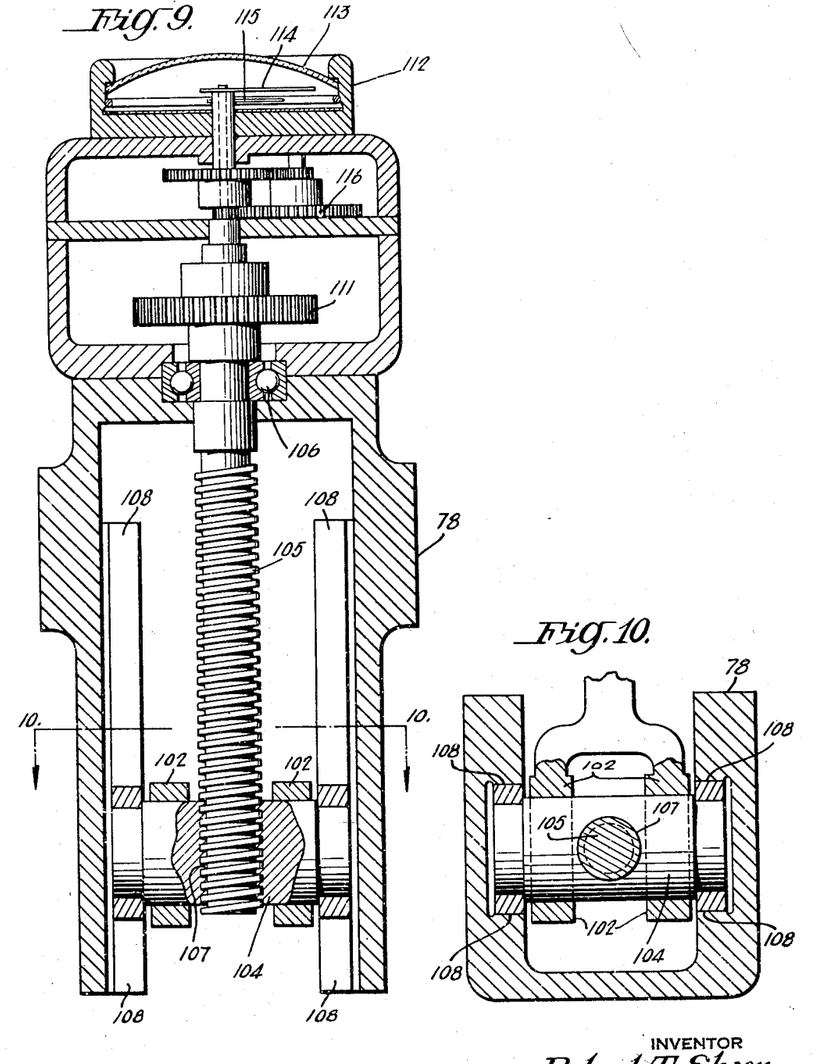
Figure 9 is a section of Figure 8 on the line 9—9.
Figure 10 is a section of Figure 9 on the line 10—10.

The pump essentially comprises a cylinder 87 having a reciprocating pump piston 88 passing through packing 90 provided with a lubrication opening 91. In this particular form of pump there are desirably used multiple inlet check valves 92 and 93 in series with one another, and multiple outlet check valves 94 and 95 likewise in series with one another. Inlet is provided at 96 and outlet at 97. The pump piston is desirably supported, moved and guided by a crosshead 98 in crosshead guides 100, lubricated at 101, the crosshead being either a part of or an adjunct to the piston as preferred.

The piston is driven by the adjustment head through the interconnecting of a link 102 having pivoted connection to the crosshead at 103 and connecting with the adjustment head at an adjustment pivot 104. The adjustment pivot 104 moves along an adjustment path toward and away from the fixed pivot of the adjustment head in order to control the stroke. This movement is preferably accomplished by an adjustment screw 105 having bearing support at 106 in the adjustment head and threading into a nut 107 which supports the adjustment pivot and is guided slidably in ways 108.

It is very convenient in obtaining the equalized 60° swing of the adjustment head to make the arm of the driving crank 83 equal to the perpendicular distance of the pivot point of the driving link on the adjustment head to the axis of the adjustment screw.

As the adjustment head swings, the worm shaft swings back and forth with it but the sprocket 72 on this shaft maintains its connection with the sprocket 68 on the fixed pivot axis by means of the chain 74.

The interconnecting between the worm shaft and the adjustment screw may be accomplished by any suitable gearing, here shown as a worm 110 on the worm shaft and a worm wheel 111 on the adjustment screw. It is important to be able to ascertain at any time the position of the adjustment pivot point. With this object in view an indicator 112 is provided at the top of the adjustment head, having a cover glass 113 showing a fast moving hand 114 and a slow moving hand 115 interconnected with the adjustment screw by suitable gearing 116 forming no part of the present invention and described in the aforesaid application of Milton Roy Sheen.

In operation, the pumping stroke will be relatively great with the adjustment pivot relatively far from the fixed pivot. With the adjustment pivot moved relatively closer to the fixed pivot the stroke is shortened by an amount preferably equal to the distance between the respective adjustment pivot positions.

It will be evident that any other suitable stroke adjustment may be employed in the present invention.

Figure 11:
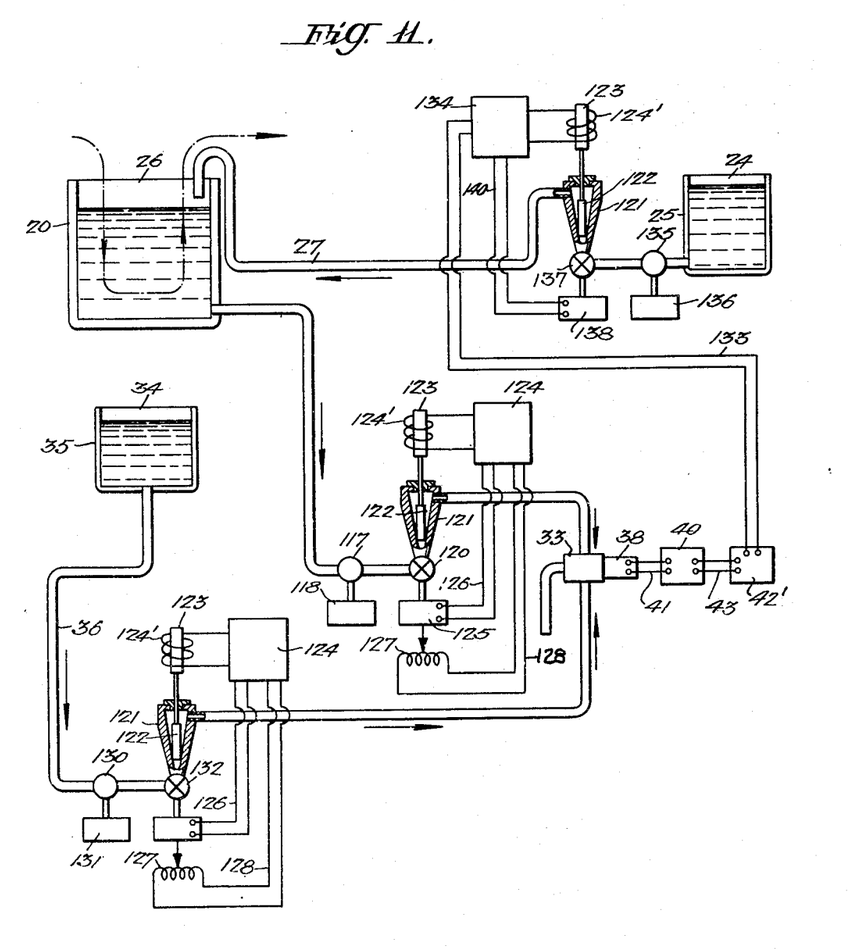
Figure 11 is a diagrammatic illustration of a variation in the system of titration in accordance with the invention.

The metering control can be accomplished in other ways, as indicated for example in Figure 11. In this form float orifice flow meter controllers, for example of the Rotometer type, are employed on the fractional sample, on the sample reagent and on the main reagent. Float orifice flow meter controllers of this character are in themselves well known, and the detail thereof forms no part of the present invention.

As shown in Figure 11, the fractional sample is pumped by a pump 117, preferably of the centrifugal type, driven by a motor 118. The effluent from the pump 117 passes through a control valve 120 and from the valve through the orifice and tapering vertical float chamber 121 of a float orifice flow meter having a float 122. From the float chamber the fractional sample passes to the titration chamber 33. The float 122 is interconnected to a magnetic armature 123 which is in inductive relation to a controlling reactance 124' of a controller of any well known type, suitably a self balancing reactance bridge or balancing relay system 124. The control valve 120 is shown as manipulated by a motor 125, rather than a hydraulic or pneumatic operator as sometimes used, which is controlled by the controller 124 through wiring 126. The motor 125 restores balance on an opposite reactance 127 connected to the controller by wiring 128. The device in effect maintains the valve 120 set at a constant flow level as well known.

The sample reagent is pumped suitably by a centrifugal pump 130 driven by a motor 131 through a valve 132. The same character of float orifice flow meter controller is used in this case and will not be separately described.

The main reagent is controlled by a similar system except that it responds to the action of the sensing element 38 as received by the indicator 40. A modified controller 42' transmits through wiring 133 an impulse to float orifice flow meter controller 134. The main reagent is pumped suitably by a centrifugal pump 135 driven by motor 136.

The effluent passes through a valve 137 manipulated by a motor 138 which is controlled through wiring 140 from the flow meter controller 134. The flow meter controller in this case employs its armature 123 in reactance 124' for indicating on the controller 134. It will be evident that other types of metering devices may be employed instead of that shown in Figure 11.

It will be evident that the control of the main reagent shown in Figure 11 or any other control of the flow of main reagent can be used with the duplex pump titration arrangement of Figure 1.

It will be evident that the centrifugal pumps 117, 130 and 135 may or may not be required individually or collectively depending upon the differential pressures available in the particular system.

Figure 13:
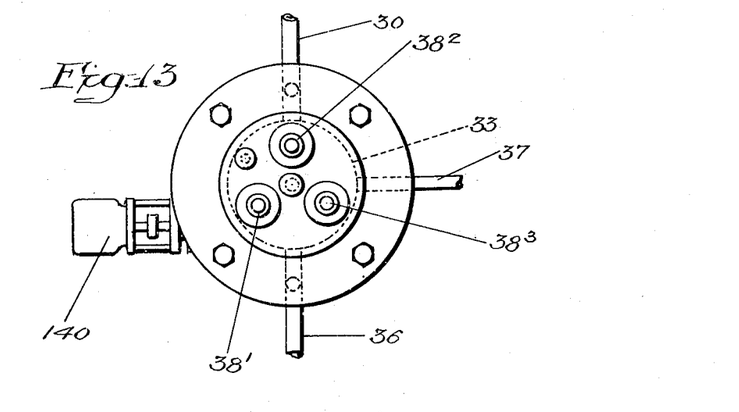
Figure 13 is a plan view of the preferred embodiment of titration chamber.
Figure 14:
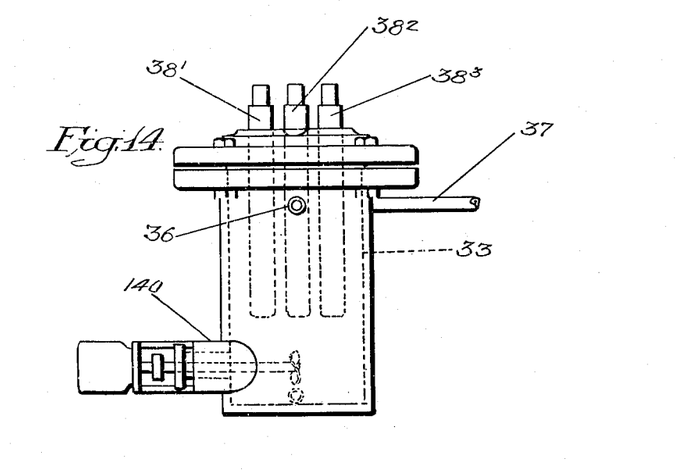
Figure 14 is a side elevation of Figure 13.

In Figures 13 and 14 a typical titration chamber 33 is illustrated showing sensing element 38 in the form of sensing electrodes 38', 38² and a temperature compensator 38³ and the fractional sample pipe 30 and the sample reagent pipe 36. Electrically driven stirring means is shown at 140.

It will be evident that the present invention provides a very simple, economical and convenient way of controlling concentration, particularly in strong solutions.

In view of my invention and disclosure variations and modifications to meet individual whim or particular need will doubtless become evident to others skilled in the art, to obtain all or part of the benefits of my invention without copying the structure shown, and I, therefore claim all such insofar as they fall within the reasonable spirit and scope of my claims.

Having thus described my invention what I claim as new and desire to secure by Letters Patent is:

1. In a titration system, a first positive displacement pump having a plurality of inlet valves and a plurality of outlet valves in series, a second positive displacement pump having a plurality of inlet valves and a plurality of outlet valves in series, a common drive connected to the first and second pumps, which maintains the pump discharges proportional, a container for a main body of liquid whose concentration is to be controlled, a pipe from the container for the main body to the outermost inlet valve of the first pump, the delivery rate of the first pump being such as to divert a partial sample from the main body, a container for a sample reagent, a pipe from the container for the sample reagent to the outermost inlet valve to the second pump, a pipe from the outermost outlet valve of the first pump and a pipe from the outermost outlet valve of the second pump connected together to combine the outputs of the partial sample and the sample reagent, a concentration sensing element in contact with the combined outputs, a container for a main reagent, a pump for the main reagent, a pipe from the container for the main reagent to the inlet of the pump for the main reagent, a pipe from the outlet of the pump for the main reagent to the main body of liquid and automatic controller means controlling the pump for the main reagent in response to the indication of the concentration sensing element.

2. In a titration system, a first positive displacement pump having a plurality of inlet valves and a plurality of outlet valves in series, a second positive displacement pump having a plurality of inlet valves and a plurality of outlet valves in series, a common drive connected to the first and second pumps and synchronized with the suction and pressure strokes in correspondence on the two pumps, a container for a main body of liquid whose concentration is to be controlled, a pipe from the container for the main body to the outermost inlet valve of the first pump, the delivery rate of the first pump being such as to divert the partial sample from the main body, a container for a sample reagent, a pipe from the container for the sample reagent to the outermost inlet valve to the second pump, a pipe from the outermost outlet valve of the first pump and a pipe from the outermost outlet valve of the second pump connected together to combine all outputs of the partial sample and the sample reagent, a concentration sensing element in contact with the combined outputs, a container for a main reagent, a pump for the main reagent, a pipe from the container for the reagent to the inlet of the pump for the main reagent, a pipe from the outlet of the pump for the main reagent to the main body of liquid and automatic controller means controlling the pump for the main reagent in response to the indication of the concentration sensing element.

ROBERT T. SHEEN.

REFERENCES CITED

The following references are of record in the file of this patent:

UNITED STATES PATENTS

| Number | Name | Date |
|---|---|---|
| 978,644 | Raabe | Dec. 13, 1910 |
| 1,375,200 | Barnickel | Apr. 19, 1921 |
| 1,684,645 | Smith | Sept. 18, 1928 |
| 1,857,922 | Lewis | May 10, 1932 |
| 2,345,465 | Miles | Mar. 28, 1944 |